Aug. 22, 1961   N. E. McFADDEN   2,996,758
CERAMIC BUSHINGS EQUIPPED WITH METAL ORIFICE TIPS
Filed March 20, 1958   2 Sheets-Sheet 2

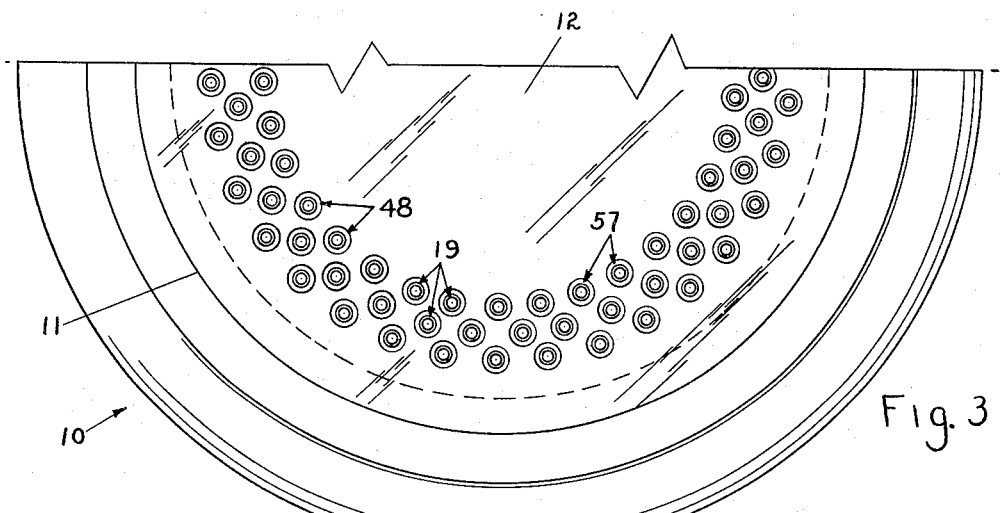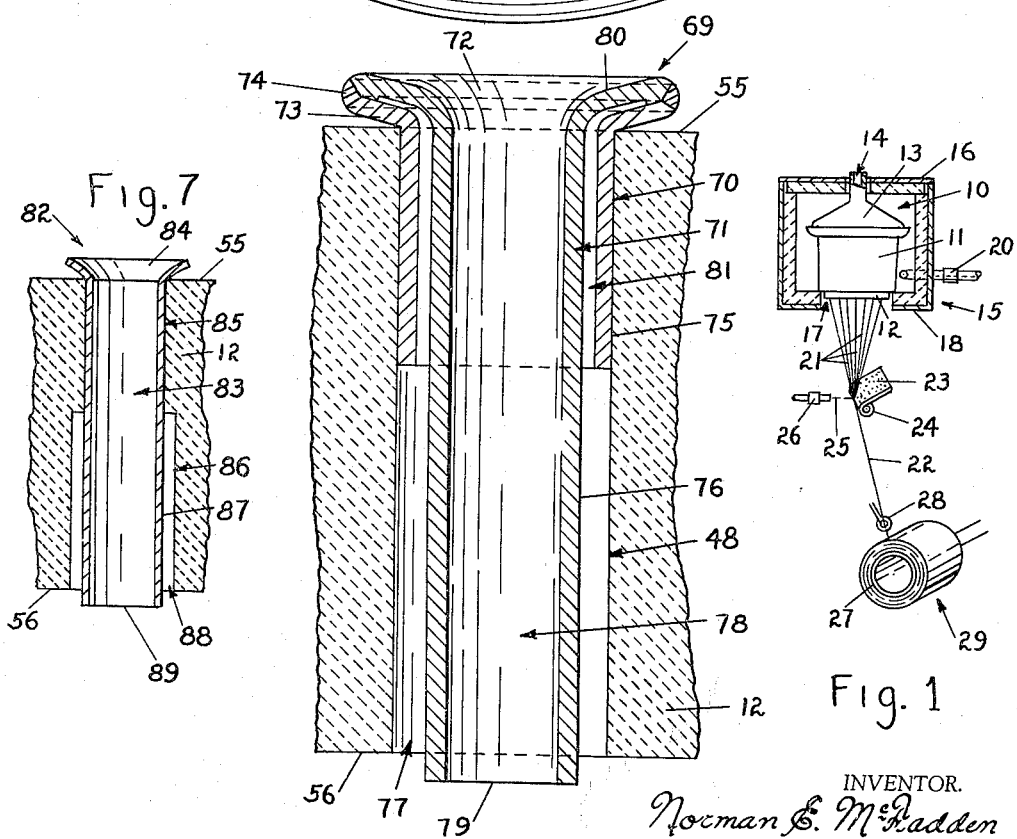

INVENTOR.
Norman E. McFadden
BY
Hobbe & Swope
ATTORNEYS

United States Patent Office 2,996,758
Patented Aug. 22, 1961

2,996,758
CERAMIC BUSHINGS EQUIPPED WITH METAL ORIFICE TIPS
Norman E. McFadden, Defiance, Ohio, assignor, by mesne assignments, to Johns-Manville Fiber Glass Inc., Cleveland, Ohio, a corporation of Delaware
Filed Mar. 20, 1958, Ser. No. 722,805
13 Claims. (Cl. 18—8)

This invention relates broadly to a ceramic bushing, or feeder, for drawing a plurality of filaments from a thermoplastic material contained therein. More specifically, it relates to a ceramic bushing provided with metal tips for drawing filaments of glass.

In the manufacture of glass filaments the bushings commonly used are of two types, ceramic or metal. The ceramic bushing is inexpensive to construct and has a satisfactory useable life. However, the nature of the material is such that it is difficult to form perfectly dimensioned and smooth surfaced orifices in the bottom through which the molten glass flows. The ceramic bushing is also prone to variations in its surface characteristics and the surface is subject to irregular erosion which too often alters the shape of the orifices shortly after the bushing is placed in operation. Due to the dimensional variations and instability of the orifices, the ceramic bushing is chiefly used for drawing the coarser diameter filaments. The metal bushing has far better dimensional stability. However, the elevated operating temperature requires use of one of the nobler metals, generally platinum or alloys thereof. Though expensive to produce, the manufacturers have found it impossible to provide a satisfactory substitute for the metal bushing when drawing fine diameter filaments.

Various attempts have been made to overcome the deficiencies of ceramic bushings by the use of metal tip inserts. However, these attempts have not produced a satisfactory bushing. One of the chief reasons for the failure of these bushings is attributed to the difficulty in reducing the temperature and viscosity of the fluid glass within the relatively short span of the orifice. As is well known in the art, the drawing temperature of the glass within the bushing is sufficient to render the glass highly fluid for uninterrupted entry into the relatively small orifices. However, the proper formation of the cones from which the filaments are drawn at the exit of each orifice requires a marked reduction in temperature to render the glass more viscous. This problem is attested to by the issuance of numerous patents relating to apparatus for cooling the cone area.

The apparatus disclosed in these prior art patents includes fluid conducting heat exchangers, radiation shields and others. Such apparatus increases the cost of the equipment, but in some instances obstructs the area adjacent the tip to such an extent that the operator must exercise great care and be unusually dexterous to thread the filaments into second operation apparatus. The apparatus disclosed herein effectively cools the cone area without the addition of obstructing apparatus.

Also, in prior attempts to develop a ceramic bushing with metal orifice tips for drawing fine diameter filaments, the outer periphery of each of the tips is substantially in total contact with the internal periphery of its receptive opening which penetrates the bottom wall of the bushing. It is an inherent characteristic of molded ceramic bushings that the density is not constant in all areas and consequently the bushing is not uniformly heated. This feature is particularly critical when the density of the ceramic material in the bottom wall of the bushing varies in that the heat conducted from the bottom wall to the individual tips and the glass flowing therethrough is proportional to the temperature of the wall area surrounding each tip. Since the streams of glass issuing from a bushing are attentuated by common means, it is desirable that the temperature of all the streams approximate the optimum drawing temperature.

Prior to the present invention, all known attempts to produce a ceramic bushing with these desirable characteristics have failed. The present invention provides simple means for reducing the temperature differential between the streams to well within commercial tolerances, as evidenced by the uniform diameter of the product, an example of which is hereinafter recited.

Continuous filaments within the range of .00035 inch to .0004 inch have been consistently produced from a bushing equipped with 200 tips each having a .104 inch diameter orifice. The same bushing has also produced filaments of considerably smaller diameter, however the important feature is that the diameter of all the filaments fall within a narrow range. Another important feature is that the orifices maintain dimensional stability over a prolonged period.

The example recited above is not to be construed as a limiting factor, for in the drawing of glass filaments variation of the glass composition, the temperature of the glass, the orifice size and the rate of speed of the attenuating means, either singly or in combination, can materially alter the filament yardage per pound of glass and the attendant filament diameter.

The subject bushing may also be advantageously used in the manufacture of glass fiber mats. Due to the uniform diameter of the filaments attenuated from the bushing, the fibers comprising the mat will also be uniform in diameter resulting in a mat of uniform texture. In addition, since the fibers making up a mat are subjected to a double attenuation, the fiber diameter may be in the order of one micron or less, depending on the velocity and temperature of the blast forming the second attenuating means.

Other advantages of the improved bushing include a tip area that is designed to eliminate flooding of its base by molten glass issuing from the tips and elevation of the tip entrance above the upper surface of the bushing bottom wall to allow space between adjacent tips for collection of sediment.

It is therefore an object of this invention to provide a ceramic bushing with metal tips that is suitable for drawing fine diameter glass filaments.

It is another object of this invention to provide a bushing for drawing fine diameter glass filaments wherein the tip section is cooled by atmospheric convection.

It is still another object of this invention to provide a bushing for drawing fine diameter glass filaments wherein the area adjacent the tip section is unobstructed.

It is yet another object of this invention to provide a bushing for drawing fine diameter glass filaments which is inexpensive and durable.

It is a further object of this invention to provide a ceramic bushing for drawing fine diameter glass filaments wherein the orifices are made of metal to provide dimensional stability thereof over a prolonged operating period.

It is a still further object of this invention to provide a bushing for drawing a plurality of fine diameter glass filaments wherein the drawing area is constructed to eliminate flooding the base of the bushing.

Other objects and advantages of the invention will become more apparent during the course of the following description, when taken in connection with the accompanying drawings.

In the drawings, wherein like numerals are employed to designate like parts throughout the same:

FIG. 1 is a schematic drawing of apparatus for producing continuous filaments of glass, employing the subject bushing;

FIG. 3 is a bottom view of the bushing;

FIG. 6 is an enlarged longitudinal section of a second modified tip; and

FIG. 7 is a longitudinal section of a third modified tip.

Figure 2:
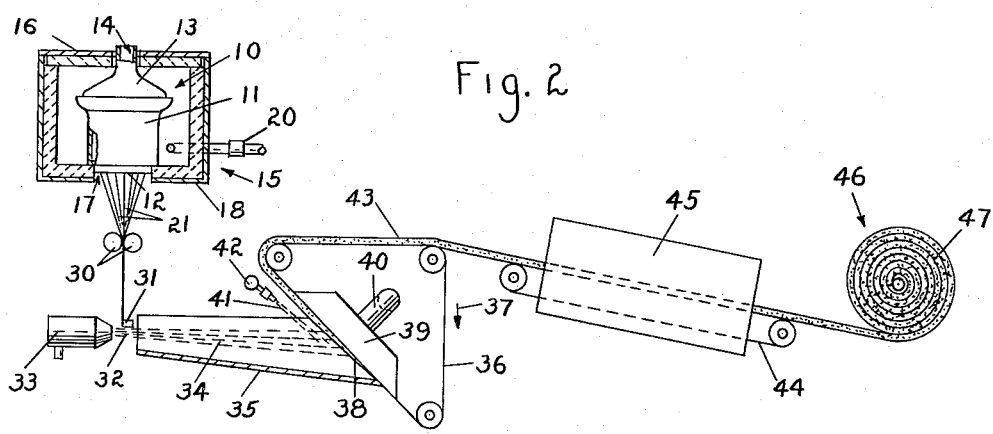
FIG. 2 is a schematic drawing of apparatus for manufacturing a mat of glass fibers, employing the subject bushing.

Referring to FIGS. 1 and 2 of the drawings, the bushing is generally indicated by the numeral 10 and includes a side wall 11 joined to a shouldered bottom 12 and is provided with a removable cover 13 extending upwardly to define a centrally disposed opening 14 through which the glass supply within the bushing may be replenished. The bushing is enclosed in a thermally insulated chamber 15 with only the portion of the bushing cover 13 containing the opening 14 projecting through a removable chamber cover 16. The chamber is also provided with a central opening 17 in the base 18 adapted to support the bushing 10 around the periphery without obstructing the orifices.

Figure 4:
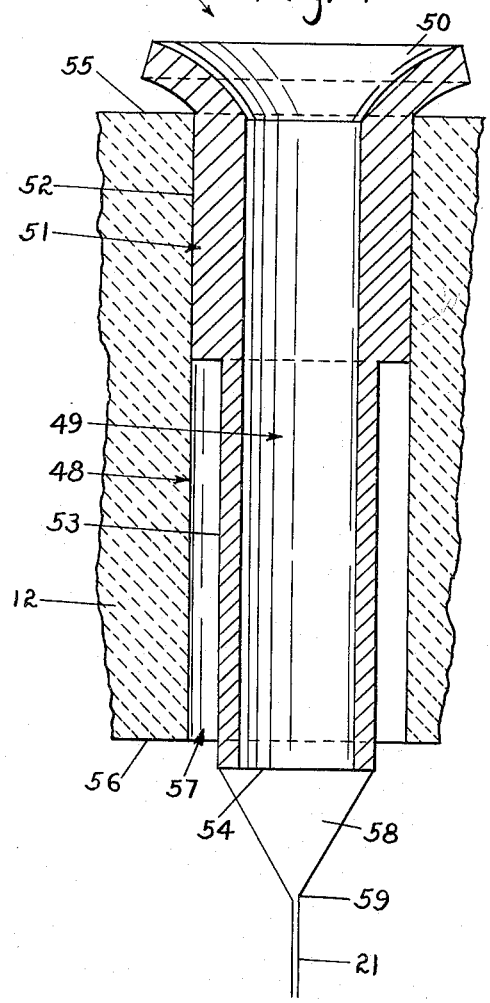
FIG. 4 is an enlarged longitudinal section of a tip.

Referring to FIGS. 3 and 4, a plurality of tips 19 extend through the bottom 12 of the bushing 10 in a number of concentric circles, with the tips equally spaced from each other.

Returning to FIGS. 1 and 2, the bushing 10 may be heated in any convenient manner, as by a flame supported by a fuel introduced into the chamber 15 by a conduit 20. Referring also to FIG. 4, the glass within the bushing is reduced to a molten mass of low viscosity by the heat and flows from the interior of the bushing 10 through the tips 19, which will be described in detail hereinafter, to form streams of glass 21.

In the production of continuous filaments, as shown in FIG. 1, the streams of glass 21 issuing from the bushing 10 are collected into a strand 22. The collection apparatus may be a pad of cloth 23 mounted upon a support 24, which pad is usually saturated with a lubricant or binder 25 supplied through a nozzle 26. The strand 22 is guided onto the face of a revolving spool 27 by a traversing mechanism 28 to form a package 29. The rotational speed of the spool is calculated to exert a pull upon the filaments 21 to attenuate them to the desired diameter.

The apparatus for producing a mat of glass fibers, shown in FIG. 2, uses the same bushing 10 enclosed in the insulated chamber 15; however, the individual filaments 21 are fed in substantially parallel spaced relation between the nip of a pair of rapidly revolving rolls 30 to attenuate the filaments. After attenuation the filaments are passed over the face of a guide block 31 and are impinged by incandescent gaseous blasts 32 emanating at high velocity from a battery of burners 33 (only one is shown) to further attenuate the filaments and to sever the filaments to form fibers 34 of varying length. The blast also forcefully carries the fibers 34 in a substantially horizontal path through a U-shaped trough 35, which trough shields the fibers from extraneous air currents. The horizontal flight of the fibers 34 terminates on the surface of a foraminous belt or chain 36 moving in a circuitous path in the direction of the arrow 37. The area in which the fibers 34 are deposited on the chain 36 is indicated by the numeral 38 and is backed by a chamber 39 connected by a conduit 40 to a vacuum producing means, such as a pump (not shown). Immediately prior to deposition of the fibers 34 upon the surface of the chain 36 a thermosetting binder 41 is sprayed upon the fibers from a battery of nozzles 42. The collection area 38 of the belt 36 may be inclined, as shown in FIG. 2, or may be disposed in a vertical or a horizontal plane.

The mat 43, comprised of the randomly deposited fibers 34 and the uncured binder 41, is carried on the belt 36 and deposited on an endless foraminous conveyor 44 which passes through an oven 45 wherein the binder is set or cured in transit. The conveyor 44 delivers a bonded mat from the oven 45 to a station 46 where the mat is packaged as in a roll 47.

Referring to FIGS. 3 and 4, a plurality of circular openings 48 extend through the bottom 12 of the bushing 10, in the concentric circular pattern previously described, each opening 48 receiving a tip 19.

As shown greatly enlarged in FIG. 4, the tip 19 is substantially tubular in configuration having a bore 49 flaring outwardly at the top as indicated by the numeral 50. The outside diameter of the wall 51 surrounding the bore follows the contour of the flared portion 50 of the bore 49 diminishing to a diameter 52 slightly larger than the diameter of the opening 48 to provide a snug press fit therebetween and continues concentrically with the bore for a distance approximating one-third the total length of the tip. At this point the wall thickness is reduced approximately one-half and continues at the reduced diameter 53 to the lower face 54 of the tip 19. A tip 19 is pressed into each opening 48 from the interior of the bushing 10 with the flared end extending above the top surface 55 of the bushing bottom 12 and with the face 54 projecting slightly below the lower surface 56 of the bushing bottom 12. The diameter 52 is in sealing relation to the upper portion of the opening 48 and an annular space 57, open at the lower end, is formed between the small diameter 53 of the tip 19 and the wall of the opening 48.

The tips 19 are made of a metal which is resistant to the high temperature and the corrosive and erosive characteristics of molten glass. For this purpose platinum or alloys thereof, wherein the alloying metal may be rhodium, is preferred.

The complete dimensions for the tip embodiment illustrated in FIG. 4 and having an orifice or bore 49 of .104 inch diameter, as used in the previously recited example, are as follows: .227 inch diameter and 3/32 inch length for the diameter 52 in sealing relation with an opening 48, and .134 inch diameter and 3/16 inch length for the diameter 53. This provides an annular recess slightly less than 3/16 inch long with a minor diameter of .134 inch and a major diameter of .227 inch.

Several important advantages accrue from the tip design disclosed above, principal among which is the projection of the tip surface 54 below the bushing surface 56 in conjunction with the annular space 57 which cooperate to prevent flooding of the molten glass across the bottom surface 56 of the bushing. In addition, the annular space 57 permits free circulation of air around the tip diameter 53 to transfer heat by convection from the tip to the atmosphere thereby reducing the temperature of the glass and progressively increasing the viscosity of the glass as it flows through that area. The latter feature results in the molten glass forming an inverted cone 58 over the lower surface 54 of the tip 19 from the vertex 59 of which the glass gravitates in a fine diameter stream 21. The most important feature resides in that only a minimum of the peripheral area of the orifice tips is in physical, heat conducting contact with the bottom wall of the bushing. In combination, these features have made it practical to draw uniform textile filaments from a ceramic bushing and when employed to produce mats have markedly improved the uniformity of the fibers comprising such mats.

Figure 5:
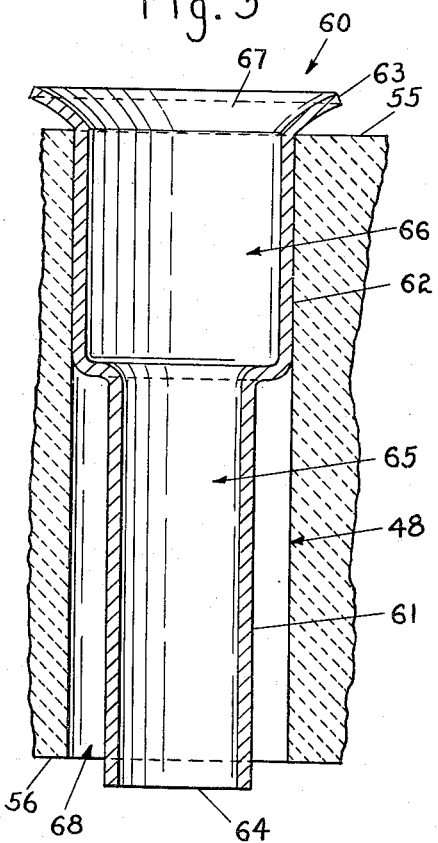
FIG. 5 is an enlarged longitudinal section of a modified tip.

The modified tip 60, shown in FIG. 5, is identical to the tip 19 of FIG. 4, except the wall thickness in the upper portion has been reduced to provide a uniform wall thickness throughout the entire length of the tip. Thus the outside diameters 61, 62 and 63 extending progressively upward from the lower face 64 of the tip 60 respectively correspond to the outside diameters 53, 52 and that encompassing the flared portion 50 of FIG. 4. However, to maintain a uniform wall structure, the bore increases from the lower diameter 65, which corresponds in diameter to the bore 49 of FIG. 4, to a diameter 66 extending upwardly from the juncture of the outside diameters 61 and 62 to the top surface 55 of the bushing bottom wall 12 and thereafter flaring outwardly as indicated by the numeral 67. Due to the reduction in wall thickness, the flared portion does not project above the face 55 to the same height as in FIG. 4, however, this could readily be modified if desired. As in FIG. 4, the outside diameter 62 is in sealing engagement with the upper portion of the opening 48 and the reduced outside diameter 61 is in concentric spaced relation to the bore 48 to provide an annular space 68 therebetween identical to the space 57 of FIG. 4. The functioning of the tip is substantially identical to that disclosed above in relation to FIG. 4.

The tip 69, shown in FIG. 6, is made of two tubes 70 and 71 respectively flared at the top, as indicated by the numerals 72 and 73, and joined by a continuous peripheral weld 74 so that the tube 70 extends downwardly in spaced, concentric relation outside the tube 71 a distance corresponding to the length of the outside diameter 52 of FIG. 4. The outside diameter 75 of the tube or shroud 70 is in sealing relation to the upper portion of the opening 48 and the outside diameter 76 of the tube 71 extending below the tube 70 is concentric with the opening 48 to provide an annular space 77 identical to the space 57 of FIG. 4. The bore 78 extending upwardly from the lower face 79 of the tube 71 is flared at the top as indicated at 80 to present a continuous surface substantially equivalent to that of FIG. 4. The primary difference in construction and function of the tip 69 of FIG. 6 with respect to the previously described functioning of tip 19 of FIG. 4 is that the annular space 77 is extended upwardly into the flared area 80 at a reduced diameter 81 thereby increasing the heat transfer area and thus increasing the temperature differential between the molten glass within the bushing and the glass at the face 79.

The modified tip 82 illustrated in FIG. 7 is made from a piece of tubing having an inside diameter 83 comparable to that of the hereinbefore disclosed embodiments. The wall thickness is held to a minimum required for strength. The tubing is flared at the upper end as indicated by the numeral 84. The bottom 12 of the bushing is provided with a plurality of circular openings, or bores, 85 extending downwardly from the top surface 55 preferably one-third but not in excess of half the thickness of the bushing where it is joined by an axially aligned counterbore 86 entering from the lower surface 56. The tips 82 are inserted into the openings 85 from the top so that the flared portion 84 projects above the surface 55, the outside diameter 87 is in sealing relation with the opening 85 and in spaced relation to the wall of the counterbore 86 to form an annular cavity 88 circumscribing the outside diameter 87 above the surface 56. The lower face 89 of the tip 82 extends below the lower surface 56 of the bushing as in the previously disclosed embodiment.

From the foregoing specification and accompanying drawings, it is evident that the tips forming the subject matter of this invention need not be arrayed in concentric circles, but may be arranged in many other patterns without departing from the spirit of the invention.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

I claim:

1. Apparatus for attenuating a plurality of filaments from a thermoplastic material, comprising a bushing made of a ceramic material for containing a supply of said thermoplastic in a fluid state, a plurality of tips penetrating the bottom of said bushing and terminating below said bottom, an orifice extending through each tip connecting the terminus thereof with the interior of said bushing from which the thermoplastic flows in small streams, each of said tips having at least a portion of its peripheral surface in spaced relation with said bottom when said bushing is at operating temperature.

2. The apparatus as defined in claim 1, wherein the tips are spaced at equal intervals.

3. The apparatus as defined in claim 1, wherein said tips are made of a metal that is resistant to high temperature and the corrosive and erosive action of molten glass.

4. Apparatus for attenuating a plurality of filaments from molten glass, comprising a ceramic bushing containing a supply of molten glass, means defining a plurality of circular openings penetrating the bottom of said bushing, and a tubular orifice tip extending through each opening in axial alignment therewith, each of said tips having an outside diameter sealingly engaging the upper peripheral surface of its opening and a reduced outside diameter in concentric spaced relation to the lower peripheral surface of its opening.

5. The apparatus as defined in claim 4, wherein each tip has a uniform wall thickness.

6. Apparatus for attenuating a plurality of filaments from molten glass, comprising a bushing containing a supply of molten glass, a plurality of circular openings penetrating the bottom of said bushing, a tubular orifice tip extending through each opening in spaced axial alignment therewith and terminating below said bushing, and a shroud joined to the upper end of each tip and in sealing engagement with the upper peripheral area of its corresponding opening.

7. Apparatus as defined in claim 6, wherein said shroud is in spaced concentric relation to the upper portion of said tip adjacent said joint.

8. Apparatus for attenuating a plurality of filaments from molten glass, comprising a ceramic bushing including a horizontally disposed base for containing a supply of molten glass, means defining a plurality of openings penetrating the base of said bushing, each of said openings being comprised of a circular bore in communication with the interior of said bushing and a complementary counterbore in axial alignment therewith, and a tubular orifice tip having an outside diameter in sealing engagement with each of said bores and in spaced annular relation to each of said counterbores.

9. The apparatus as defined in claim 8, wherein the tips extend below the base of said bushing.

10. The apparatus as defined in claim 8, wherein each tip has a uniform wall thickness.

11. Apparatus for attenuating a plurality of filaments from a thermoplastic material comprising a bushing containing a supply of said thermoplastic material in a fluid state, and a plurality of insertable orifice tips extending through the bottom wall of said bushing and terminating below a bottom surface thereof, each of said tips having at least a portion of its peripheral surface in spaced relation with said bottom wall when said bushing is at operating temperature.

12. Apparatus for attenuating a plurality of filaments from a thermoplastic material, comprising a ceramic bushing for containing a supply of said thermoplastic material in a fluid state, said bushing having a base approximately ¼ inch thick, a plurality of metallic tips, each of said tips having a cylindrical portion approximately 9/32 inch in length and extending through said base, and approximately 1/32 inch beyond, at least a portion of said length being of reduced diameter, each of said tips having at least a portion of its peripheral surface in spaced relation with said base when said bushing is at operating temperatures, and an orifice extending through each tip connecting the terminus thereof with the interior of said bushing from which the thermoplastic material is exuded.

13. Apparatus for attenuating a plurality of filaments from molten glass, comprising a ceramic bushing containing a supply of molten glass, said bushing having a base defining a plurality of circular openings, said base being approximately ¼ inch thick, and a tubular orifice tip approximately 9/32 inch in length extending beyond each opening for a length of approximately 1/32 inch and in axial alignment therewith, each of said tips having an outside diameter of approximately .227 inch sealingly engaging the upper peripheral surface of its respective opening and an outside diameter of approximately .134 inch in concentric spaced relation to the lower peripheral surface of its respective opening.

References Cited in the file of this patent

UNITED STATES PATENTS

| 2,190,296 | Richardson | Feb. 13, 1940 |
| 2,323,000 | Auwarter et al. | June 29, 1943 |
| 2,728,699 | Labino | Dec. 27, 1955 |
| 2,814,657 | Labino | Nov. 26, 1957 |

FOREIGN PATENTS

| 930,934 | France | Sept. 8, 1947 |
| 564,017 | Great Britain | Sept. 8, 1944 |